(12) United States Patent
Hwang et al.

(10) Patent No.: US 9,473,267 B2
(45) Date of Patent: Oct. 18, 2016

(54) METHOD AND APPARATUS FOR TRANSMITTING UPLINK CONTROL INFORMATION

(71) Applicant: LG ELECTRONICS INC., Seoul (KR)

(72) Inventors: Daesung Hwang, Anyang-si (KR); Dongyoun Seo, Anyang-si (KR); Bonghoe Kim, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 14/376,588

(22) PCT Filed: Feb. 5, 2013

(86) PCT No.: PCT/KR2013/000907
§ 371 (c)(1),
(2) Date: Aug. 4, 2014

(87) PCT Pub. No.: WO2013/119015
PCT Pub. Date: Aug. 15, 2013

(65) Prior Publication Data
US 2015/0016373 A1 Jan. 15, 2015

Related U.S. Application Data

(60) Provisional application No. 61/595,621, filed on Feb. 6, 2012, provisional application No. 61/645,061, filed on May 10, 2012.

(51) Int. Cl.
*H04L 1/00* (2006.01)
*H04L 1/18* (2006.01)
*H04L 1/16* (2006.01)

(52) U.S. Cl.
CPC ........... *H04L 1/0061* (2013.01); *H04L 1/0027* (2013.01); *H04L 1/0028* (2013.01);
(Continued)

(58) Field of Classification Search
CPC .. H04L 1/0038; H04L 1/0079; H04L 1/0026
See application file for complete search history.

(56) References Cited

U.S. PATENT DOCUMENTS

2011/0243087 A1* 10/2011 Ahn .................... H04W 52/146
370/329
2011/0249578 A1* 10/2011 Nayeb Nazar ........ H04L 1/0027
370/252

(Continued)

FOREIGN PATENT DOCUMENTS

KR   10-2009-0099469   9/2009
KR   10-2010-0065865   6/2010

(Continued)

OTHER PUBLICATIONS

PCT International Application No. PCT/KR2013/000907, Written Opinion of the International Searching Authority dated May 16, 2013, 1 page.

*Primary Examiner* — Andrew Chriss
*Assistant Examiner* — Romani Ohri
(74) *Attorney, Agent, or Firm* — Lee Hong Degerman Kang & Waimey; Jonathan Kang; Jeffrey Lotspeich

(57) ABSTRACT

A method for transmitting uplink control information and a wireless device are provided. The wireless device masks the cyclic redundancy check (CRC) of a first piece of uplink control information with a masking sequence related to a second piece uplink control information and transmits the masked first piece of uplink control information to an uplink channel.

10 Claims, 11 Drawing Sheets

(52) U.S. Cl.
CPC ........... *H04L1/0073* (2013.01); *H04L 1/0079* (2013.01); *H04L 1/1671* (2013.01); *H04L 1/1812* (2013.01); *H04L 1/0026* (2013.01); *H04L 1/0071* (2013.01)

(56) References Cited

U.S. PATENT DOCUMENTS

2011/0249641 A1* 10/2011 Kwon ............... H04W 74/0858
370/329

2011/0269490 A1* 11/2011 Earnshaw ............. H04L 1/0026
455/509
2012/0210187 A1* 8/2012 Yin ..................... H03M 13/136
714/751
2013/0121312 A1* 5/2013 Roman ................ H04B 7/0486
370/335

FOREIGN PATENT DOCUMENTS

| KR | 10-2010-0086920 | 8/2010 |
| KR | 10-2010-0088554 | 8/2010 |
| WO | 2011/013986 | 2/2011 |

* cited by examiner

| l: | 0 | 1 | 2 | | 3 | 4 | 5 | 6 | 7 | 8 | | 9 | 10 | 11 |
|---|---|---|---|---|---|---|---|---|---|---|---|---|---|---|
| | 0 | 1 | 72 | | 69 | 2 | 3 | 4 | 5 | 70 | | 71 | 6 | 7 |
| | 8 | 9 | 76 | | 73 | 10 | 11 | 12 | 13 | 74 | | 75 | 14 | 15 |
| | 16 | 17 | 80 | | 77 | 18 | 19 | 20 | 21 | 78 | | 79 | 22 | 23 |
| | 24 | 25 | 84 | | 81 | 26 | 27 | 28 | 29 | 82 | | 83 | 30 | 31 |
| | 32 | 33 | 28 | | 31 | 34 | 35 | 36 | 37 | 30 | | 29 | 38 | 39 |
| | 40 | 24 | 24 | | 27 | 41 | 42 | 43 | 26 | 26 | | 25 | 25 | 44 |
| | 45 | 20 | 20 | | 23 | 23 | 46 | 47 | 22 | 22 | | 21 | 21 | 48 |
| | 49 | 16 | 16 | | 19 | 19 | 50 | 51 | 18 | 18 | | 17 | 17 | 52 |
| | 53 | 12 | 12 | | 15 | 15 | 54 | 55 | 14 | 14 | | 13 | 13 | 56 |
| | 57 | 8 | 8 | | 11 | 11 | 58 | 59 | 10 | 10 | | 9 | 9 | 60 |
| | 61 | 4 | 4 | | 7 | 7 | 62 | 63 | 6 | 6 | | 5 | 5 | 64 |
| | 65 | 0 | 0 | | 3 | 3 | 66 | 67 | 2 | 2 | | 1 | 1 | 68 |

RI  CSI  A/N  RS

| l: | 0 | 1 | 2 | 3 | 4 | 5 | 6 | 7 | 8 | 9 | 10 | 11 |
|---|---|---|---|---|---|---|---|---|---|---|---|---|
| | 0 | 1 | 69 | 81 | 2 | 3 | 4 | 5 | 93 | 105 | 6 | 7 |
| | 8 | 9 | 70 | 82 | 10 | 11 | 12 | 13 | 94 | 106 | 14 | 15 |
| | 16 | 17 | 71 | 83 | 18 | 19 | 20 | 21 | 95 | 107 | 22 | 23 |
| | 24 | 25 | 72 | 84 | 26 | 27 | 28 | 29 | 96 | 108 | 30 | 31 |
| | 32 | 33 | 28 | 31 | 34 | 35 | 36 | 37 | 30 | 29 | 38 | 39 |
| | 40 | 24 | 24 | 27 | 41 | 42 | 41 | 26 | 26 | 25 | 25 | 44 |
| | 45 | 20 | 20 | 23 | 23 | 46 | 47 | 22 | 22 | 21 | 21 | 48 |
| | 49 | 16 | 16 | 19 | 19 | 50 | 51 | 18 | 18 | 17 | 17 | 52 |
| | 53 | 12 | 12 | 15 | 15 | 54 | 55 | 14 | 14 | 13 | 13 | 56 |
| | 57 | 8 | 8 | 11 | 11 | 58 | 59 | 10 | 10 | 9 | 9 | 60 |
| | 61 | 4 | 4 | 7 | 7 | 62 | 63 | 6 | 6 | 5 | 5 | 64 |
| | 65 | 0 | 0 | 3 | 3 | 66 | 67 | 2 | 2 | 1 | 1 | 68 |

RI     CSI     A/N     RS

FIG. 9

| l: | 0 | 1 | 2 | | 3 | 4 | 5 | 6 | 7 | 8 | | 9 | 10 | 11 |
|---|---|---|---|---|---|---|---|---|---|---|---|---|---|---|
| | 0 | 48 | 53 | | 65 | 78 | 1 | 2 | 84 | 89 | | 101 | 113 | 3 |
| | 4 | 49 | 54 | | 66 | 79 | 5 | 6 | 85 | 90 | | 102 | 114 | 7 |
| | 8 | 50 | 55 | | 67 | 80 | 9 | 10 | 86 | 91 | | 103 | 115 | 11 |
| | 12 | 51 | 56 | | 68 | 81 | 13 | 14 | 87 | 92 | | 104 | 116 | 15 |
| | 16 | 52 | 28 | | 31 | 82 | 17 | 18 | 88 | 30 | | 29 | 117 | 19 |
| | 20 | 24 | 24 | | 27 | 83 | 21 | 22 | 26 | 26 | | 25 | 25 | 23 |
| | 24 | 20 | 20 | | 23 | 23 | 25 | 26 | 22 | 22 | | 21 | 21 | 27 |
| | 28 | 16 | 16 | | 19 | 19 | 29 | 30 | 18 | 18 | | 17 | 17 | 31 |
| | 32 | 12 | 12 | | 15 | 15 | 33 | 34 | 14 | 14 | | 13 | 13 | 35 |
| | 36 | 8 | 8 | | 11 | 11 | 37 | 38 | 10 | 10 | | 9 | 9 | 39 |
| | 40 | 4 | 4 | | 7 | 7 | 41 | 42 | 6 | 6 | | 5 | 5 | 43 |
| | 44 | 0 | 0 | | 3 | 3 | 45 | 46 | 2 | 2 | | 1 | 1 | 47 |

RI   CSI   A/N   RS

METHOD AND APPARATUS FOR TRANSMITTING UPLINK CONTROL INFORMATION

CROSS-REFERENCE TO RELATED APPLICATIONS

This application is the National Stage filing under 35 U.S.C. 371 of International Application No. PCT/KR2013/000907, filed on Feb. 5, 2013, which claims the benefit of U.S. Provisional Application Ser. No. 61/595,621, filed on Feb. 6, 2012, and 61/645,061, filed on May 10, 2012, the contents of which are all hereby incorporated by reference herein in their entirety.

BACKGROUND OF THE INVENTION

1. Field of the Invention

The present invention relates to wireless communications, and more particularly, to a method and apparatus for transmitting uplink control information in a wireless communication system.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-Advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The uplink channel is used to transmit a variety of uplink control information such as hybrid automatic repeat request (HARQ) positive-acknowledgement (ACK)/negative-acknowledgement (NACK), channel state information (CSI), and scheduling request (SR).

A radio resource for the uplink channel may be more restrictive than a radio resource for the downlink channel, and a transmission error of uplink control information may aggravate service quality. Such a fact must be considered when the uplink channel is designed.

SUMMARY OF THE INVENTION

The present invention provides a method of transmitting uplink control information and a wireless device using the method.

In an aspect, a method for transmitting uplink control information in a wireless communication system is provided. The method includes masking a cyclic redundancy check (CRC) of first uplink control information with a masking sequence related to second uplink control information, and transmitting the masked first uplink control information through an uplink channel.

The first uplink control information may include channel state information (CSI), and the second uplink control information may include a hybrid automatic repeat request (HARQ) positive-acknowledgement (ACK)/negative-acknowledgement (NACK).

In another aspect, a wireless device for transmitting uplink control information in a wireless communication system is provided. The wireless device includes a radio frequency (RF) unit configured to transmit and receive a radio signal, and a processor operatively coupled to the RF unit and configured to mask a cyclic redundancy check (CRC) of first uplink control information with a masking sequence related to second uplink control information and transmit the masked first uplink control information through an uplink channel via the RF unit.

Transmission reliability of a variety of uplink control information can be increased.

BRIEF DESCRIPTION OF THE DRAWINGS

FIG. 9 shows resource mapping according to another embodiment of the present invention.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Figure 1:
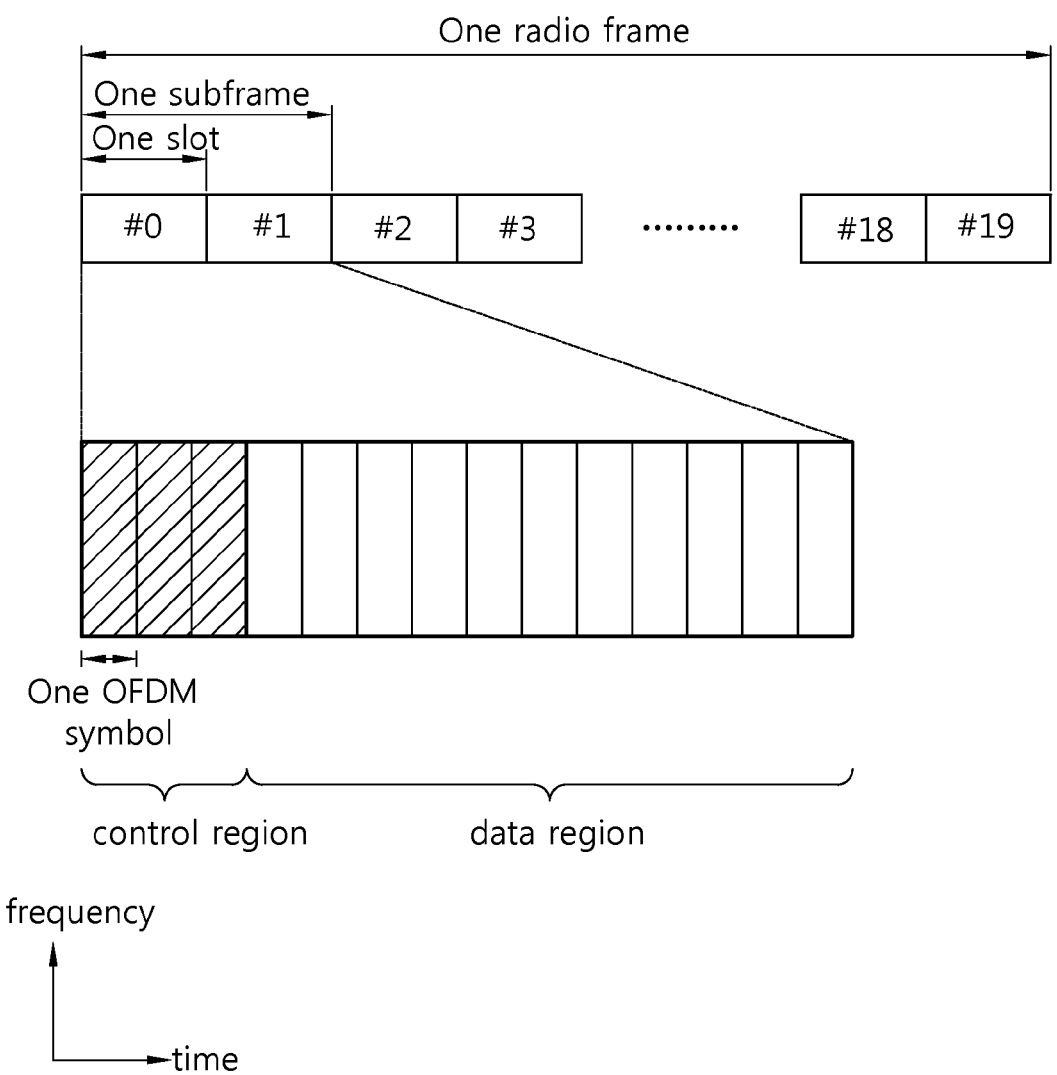
FIG. 1 shows a structure of a downlink (DL) radio frame in $3^{rd}$ generation partnership project (3GPP) long term evolution (LTE).

FIG. 1 shows a structure of a downlink (DL) radio frame in 3GPP LTE. The section 4 of 3GPP TS 36.211 V10.4.0 (2011-12) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.4.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A DL subframe is divided into a control region and a data region in the time domain. The control region includes up to $1^{st}$ four OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.4.0, in 3GPP LTE, a physical channel may be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink (UL) hybrid automatic repeat request (HARQ). The ACK/NACK signal for UL data on a PUSCH transmitted by the wireless device is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking. The BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

According to 3GPP TS 36.211 V10.4.0, an uplink channel includes a PUSCH, a PUCCH, a sounding reference signal (SRS), and a physical random access channel (PRACH).

Figure 2:
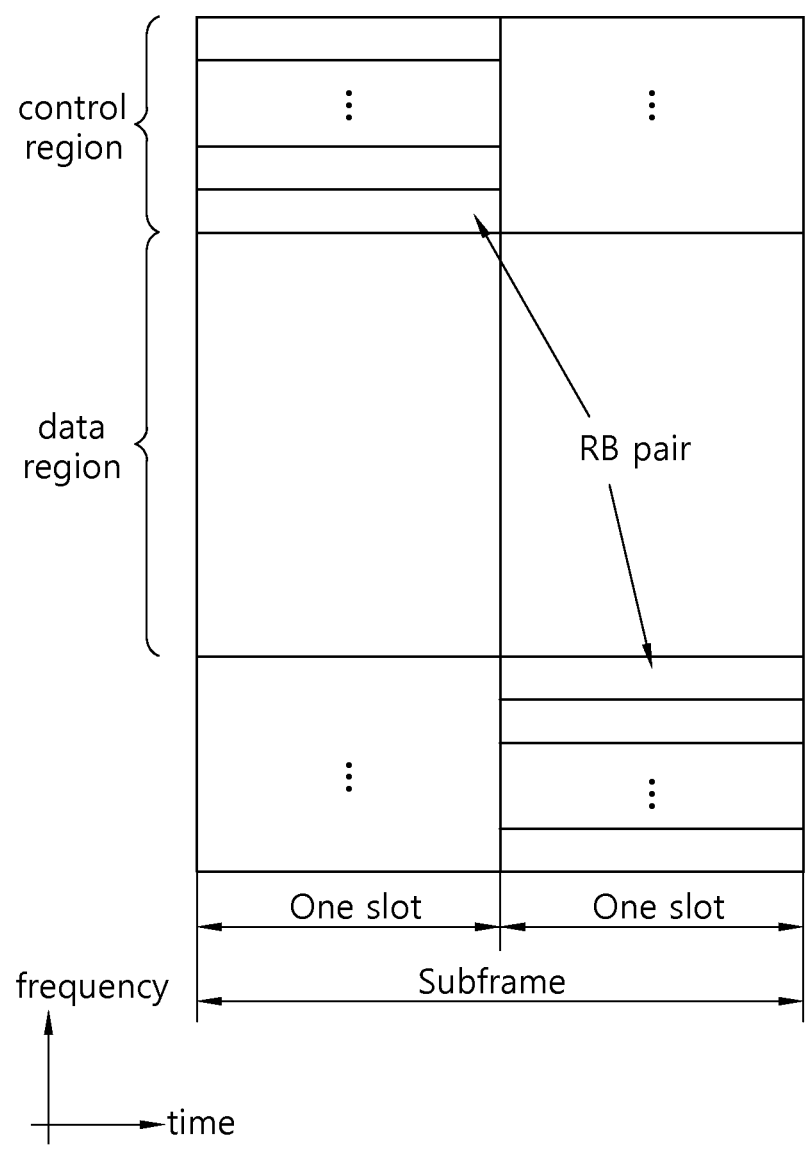
FIG. 2 shows a structure of an uplink (UL) subframe in 3GPP LTE.

FIG. 2 shows a structure of an uplink (UL) subframe in 3GPP LTE.

The UL subframe can be divided into a control region and a data region in a frequency domain. The control region is a region to which a physical uplink control channel (PUCCH) is allocated. The data region is a region to which a physical uplink shared channel (PUSCH) is allocated.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

The PUSCH is allocated by a UL grant the PDCCH. Although not shown, a $4^{th}$ OFDM symbol of each slot of a normal CP is used in demodulation reference signal (DM RS) transmission.

Uplink control information (UCI) includes HARQ ACK/NACK, channel state information (CSI), and scheduling request (SR). Hereinafter, as an indicator for indicating a state of a DL channel, the CSI may include any one of a channel quality indicator (CQI) and a precoding matrix indicator (PMI).

Various methods are used for UCI transmission.

The PUCCH is used only for UCI transmission. For this, the PUCCH supports multiple formats. A PUCCH having a different number of bits per subframe can be used according to a modulation scheme which is dependent on the PUCCH format. The PUCCH format 1 is used for transmission of the SR. The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

The UCI may be transmitted on the PUSCH either alone or together with a UL transport block. This is called UCI multiplexing.

Figure 3:
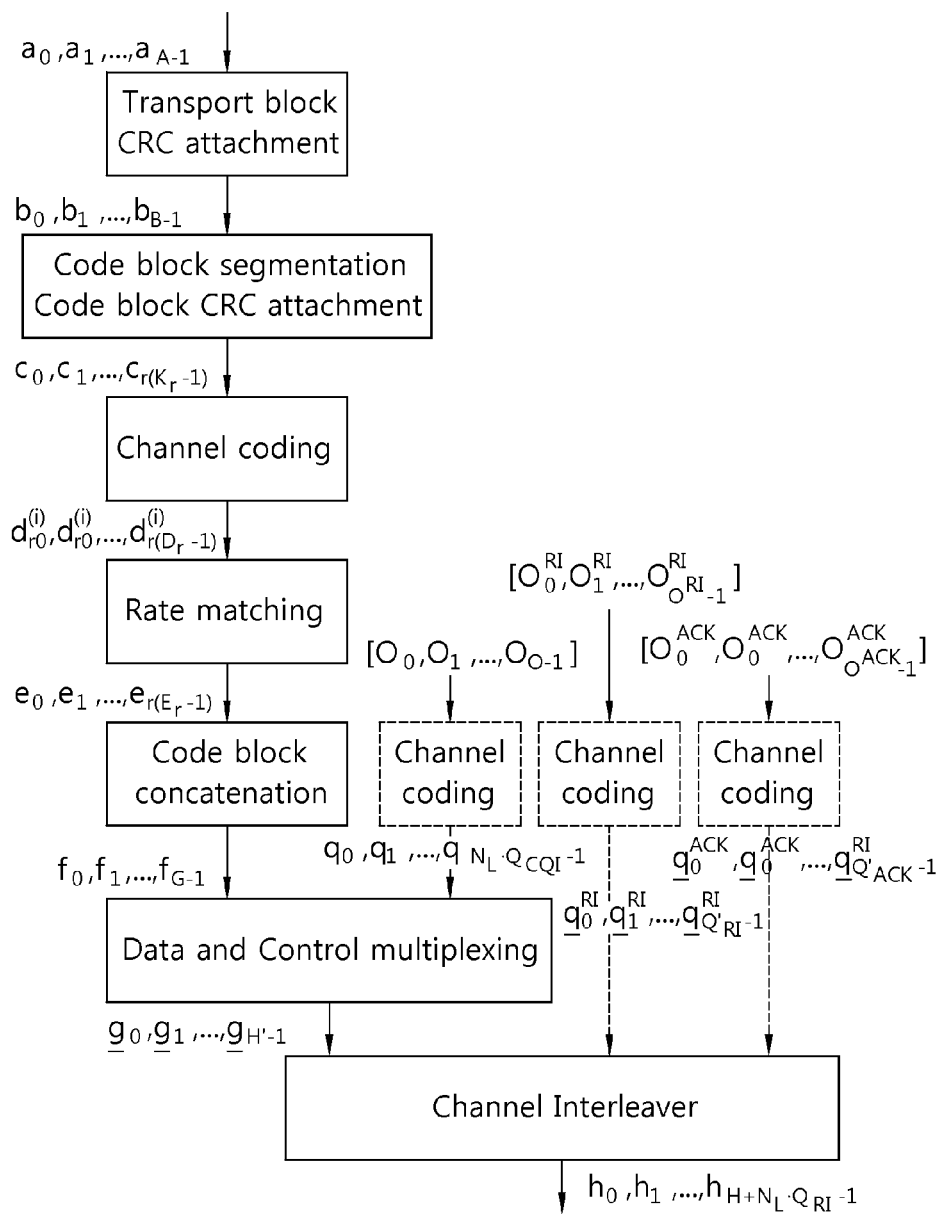
FIG. 3 shows an example of uplink control information (UCI) multiplexing in 3GPP LTE.

FIG. 3 shows an example of UCI multiplexing in 3GPP LTE. The section 5 of 3GPP TS 36.212 V10.4.0 (2011-12) "Evolved Universal Terrestrial Radio Access (E-UTRA); Multiplexing and channel coding (Release 10)" may be incorporated herein by reference.

Data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, B=A+L.

The CRC-attached bits $b_0, b_1, \ldots, b_{B-1}$ are segmented in a code block unit, and the CRC parity bits are re-attached in the code block unit. $c_{r0}, c_{r1}, \ldots, c_{r(K_r-1)}$ denote a bit sequence output after the code block segmentation. Herein, if a total number of code blocks is C, r denotes a code block number, and Kr denotes the number of bits for the code block number r.

Channel coding is performed on a bit sequence for a given code block. $d^{(i)}_0, d^{(i)}_1, \ldots, d^{(i)}_{D-1}$ denote encoded bits, D denotes the number of encoded bits for each output stream, and denotes an index of a bit stream output from an encoder.

Rate matching is performed on the encoded bits. Then, code block concatenation is performed on the rate-matched bits. As a result, a data bit sequence $f_0, f_1, \ldots, f_{G-1}$ is generated. Herein, G denotes a total number of encoded bits used to transmit bits other than bits used in control information transmission when the control information is multiplexed on a PUSCH.

The UCI is coded independently in a format of CSI, rank indicator (RI), and HARQ ACK/NACK.

Hereinafter, CSI coding will be described.

Channel coding is performed on CQIs $o_0, o_1, \ldots, o_{O-1}$ (where O is the number of CQI bits) to generate a control information bit sequence $q_0, q_1, \ldots, q_{Q-1}$. $N_L$ is the number of layers to which a UL transport block is mapped, and $Q_{CQI}$ is the number of bits per layer that can be used for the CSI.

For example, a (32, O) block code may be used as channel coding for the CQI.

$b_0, b_1, \ldots, b_{31}$ denote an intermediate sequence for CQI channel coding and can be generated by the following equation.

$$b_i = \sum_{n=0}^{O-1} (o_n \cdot M_{i,n}) \bmod 2, \text{ where } i = 0, 1, 2, \ldots, 31 \quad \text{[Equation 1]}$$

$M_{i,n}$ is a basis sequence for the (32, O) block code.

The control information bit sequence $q_0, q_1, \ldots, q_{Q-1}$ is generated by cyclically repeating the intermediate sequence $b_0, b_1, \ldots, b_{31}$ according to the following equation.

$$q_i = b_{(i \bmod 31)}, \text{ where } i=0, 1, \ldots, N_L Q_{CQI}-1 \quad \text{[Equation 2]}$$

A data bit sequence $f_0, f_1, \ldots, f_{G-1}$ is multiplexed together with the CSI bit sequence into a multiplexed sequence $g_0, g_1, \ldots, g_{H'-1}$. In the multiplexed symbol sequence, the CSI may be first arranged, and thereafter a UL transport block may be arranged. H denotes the total number of bits allocated to the PUSCH, and is defined as $H=G+N_L Q_{CQI}$. Herein, $q_i$ is a modulation symbol on constellation, and $H'=H/Q_m$. $Q_m$ denotes the number of bits for each modulation symbol of a modulation scheme. For example, when quadrature phase shift keying (QPSK) is used as the modulation scheme, $Q_m=2$.

The channel interleaver implements time-first mapping of a modulation symbol of the PUSCH.

Figure 4:
FIG. 4 shows an example of resource mapping on a physical uplink shared channel (PUSCH).

FIG. 4 shows an example of resource mapping on a PUSCH.

In a normal CP case, one slot includes 7 OFDM symbols, and a $4^{th}$ OFDM symbol in each slot is used in DM RS transmission. Therefore, the number of OFDM symbols used for a PUSCH in one subframe is $N^{PUSCH}_{sym}=12$. l=0, 1, . . . , 11 indicates an index of an OFDM symbol allocated to the PUSCH.

An RmuxxCmux mapping matrix is defined for a channel interleaver. Cmux is the number of columns, and is defined as $Cmux=N^{PUSCH}_{sym}$. Rmux is the number of rows, and is related to the number of subcarriers allocated to k PUSCHs (where k=0, 1, . . . , R). An element of the mapping matrix to which each modulation symbol is mapped is (k,l), where k=0, 1, . . . , Rmux−1, l=0, 1, . . . , Cmux.

To simplify explanations, FIG. 4 shows a case where Rmux=12, Cmux=12.

(1) Step 1: A modulation symbol of RI is mapped to an OFDM symbol with l=1, 4, 7, 10.

(2) Step 2: A multiplexed symbol sequence $g_0, g_1, \ldots, g_{H'-1}$ is mapped in an ascending order of l starting from k=0. This is called time-first mapping.

(3) Step 3: A modulation symbol of HARQ ACK/NACK is mapped to an OFDM symbol with l=2, 3, 8, 9. This implies that the multiplexed symbol sequence mapped in Step 2 is overwritten. Overwriting of a modulation sequence which has already been mapped to a resource element is called puncturing.

Among modulation symbols in the multiplexed symbol sequence, a punctured modulation symbol cannot be transmitted. This implies that, if a modulation symbol to be punctured corresponds to CSI, it may have an effect on CSI demodulation performed by a BS.

Now, CSI transmission on a PUSCH is described. The CSI transmission on the PUSCH is called aperiodic CSI reporting in a sense that it is triggered at a request of a BS. The CSI reporting may be triggered by a UL grant or a random access response grant.

Figure 5:
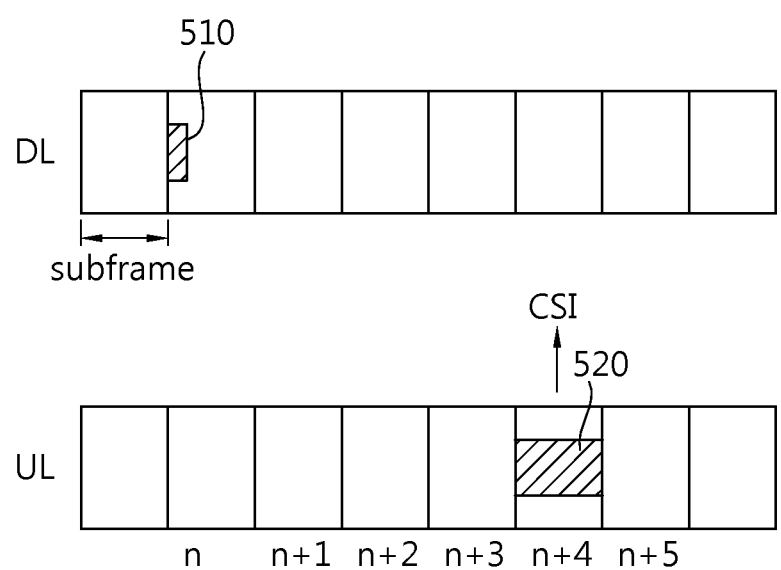
FIG. 5 shows an example of aperiodic channel state information (CSI) reporting in 3GPP LTE.

FIG. 5 shows an example of aperiodic CSI reporting in 3GPP LTE.

A wireless device receives a UL grant including scheduling information for a PUSCH on a PDCCH 510 in a subframe n. The UL grant may include a CQI request field. The following table shows an example of a 2-bit CQI request field. A value of the CQI request field or the number of CQI request fields is for exemplary purposes only.

TABLE 1

| Value of CQI request field | Content |
|---|---|
| 00 | CSI reporting is not triggered. |
| 01 | CSI reporting for serving cell is triggered. |
| 10 | CSI reporting for $1^{st}$ set of serving cell is triggered. |
| 11 | CSI reporting for $2^{nd}$ set of serving cell is triggered. |

Information on the $1^{st}$ and $2^{nd}$ sets for which the CSI reporting is triggered may be reported in advance by the BS to the wireless device.

If the CSI reporting is triggered, the wireless device transmits CSI on a PUSCH 520 in a subframe n+k. Although k=4 herein, this is for exemplary purposes only.

A CSI reporting mode may be designated in advance by the BS to the wireless device.

The following table shows an example of the CSI reporting mode in 3GPP LTE.

TABLE 2

| | PMI feedback type | | |
|---|---|---|---|
| | No PMI | Single PMI | Multiple PMI |
| Wideband CQI | | | Mode 1-2 |
| Selective subband CQI | Mode 2-0 | | Mode 2-2 |
| Configured subband CQI | Mode 3-0 | Mode 3-1 | |

(1) Mode 1-2

A precoding matrix is selected under the assumption that DL data is transmitted for each subband only through a corresponding subband. The wireless device generates a CQI (this is called a wideband CQI) by assuming a selected precoding matrix as to a system band or a whole band (called a band set S) designated by a higher layer signal.

The wireless device transmits CSI including a wideband CQI and a PMI value of each subband. In this case, a size of each subband may vary depending on a size of the system band.

(2) Mode 2-0

The wireless device selects preferred M subbands as to a system band or a band (i.e., a band set S) designated by a higher layer signal. The wireless device generates one CQI under the assumption that data is transmitted in the selected M subbands. The wireless device additionally generates one wideband CQI as to the system band or the band set S.

The wireless device transmits CSI including information regarding the selected M subbands, the subband CQI, and the wideband CQI.

(3) Mode 2-2

The wireless device selects a location of M preferred subbands and a single precoding matrix for the M preferred subbands simultaneously under the assumption that DL data is transmitted through M preferred subbands.

A CQI for the M preferred subbands is defined for each codeword. Additionally, a wideband CQI is generated as to the system band or the band set S.

The wireless device transmits CSI including M preferred subbands, one subband CQI, PMI for the M preferred subbands, wideband PMI, and wideband CQI.

(4) Mode 3-0

The wireless device transmits CSI including a wideband CQI and a subband CQI for a configured subband.

(5) Mode 3-1

The wireless device generates a single precoding matrix for a system band or a band set S. The wireless device generates a subband CQI per codeword by assuming a generated single precoding matrix. The wireless device may generate a wideband CQI by assuming the single precoding matrix.

A plurality of serving cells have been introduced in 3GPP LTE since the release 10. Therefore, since UCI also includes each serving cell's CSI, HARQ ACK/NACK (hereinafter, simply referred to as 'A/N'), an amount of the UCI is increased.

For example, when there are two serving cells and when A/N for the two serving cells is transmitted on one PUSCH, the number of bits of the A/N is increased. As described above, if CSI and A/N are multiplexed on the PUSCH, a modulation symbol of the CSI is punctured. Therefore, if the number of bits of the A/N is increased, the number of bits of CSI to be punctured is increased, which may lead to a deterioration in CSI reporting capability.

Hereinafter, it is assumed that $1^{st}$ UCI includes CSI and $2^{nd}$ UCI includes A/N. Those ordinarily skilled in the art may know that the embodiment of the present invention is applicable to a variety of UCI. For example, the $1^{st}$ UCI may include A/N, and the $2^{nd}$ UCI may include CSI. The $1^{st}$ UCI may include CSI, and the $2^{nd}$ UCI may include RI. The $1^{st}$ UCI may include CSI, and the $2^{nd}$ UCI may include SR. The $1^{st}$ UCI may include A/N, and the $2^{nd}$ UCI may include SR.

Figure 6:
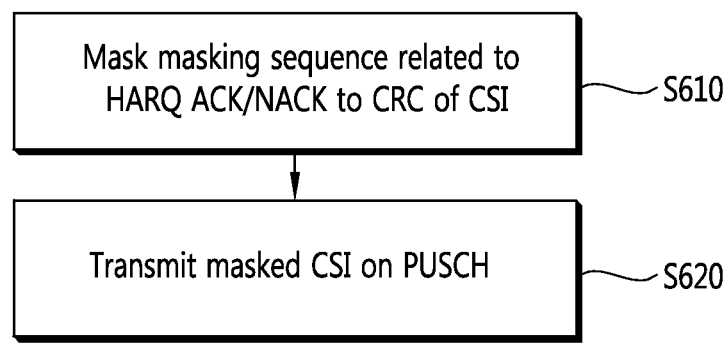
FIG. 6 is a flowchart showing a control information transmission method according to an embodiment of the present invention.

FIG. 6 is a flowchart showing a control information transmission method according to an embodiment of the present invention.

In step S610, a wireless device masks a masking sequence related to A/N with respect to cyclic redundancy check (CRC) of CSI. Aperiodic CSI may be triggered in a corresponding UL subframe, and A/N may also be triggered and multiplexed in one PUSCH. According to the conventional technique, A/N is transmitted by simply puncturing modulation symbols of the CSI. According to the proposed technique, information related to whether the A/N is transmitted is reported by the wireless device to the BS by using the CRS of the CSI.

The CSI to which the CRC is attached may be bits before performing channel coding or bits which are encoded after performing channel coding. The number of bits of (encoded or not-encoded) CSI before the CRC is attached may be greater than 11, but the present invention is not limited thereto.

For example, when P denotes the number of bits of the CSI to which the CRS is attached, M denotes the number of bits of the CRC, a CSI bit sequence is $\{b_0, \ldots, b_{P-1}\}$, and a masking sequence is $\{x_0, \ldots, x_{M-1}\}$, then a masked CSI sequence $m_k$ to which the CRC is masked may be represented as follows.

$$m_k = b_k \text{ for } k=0, 1, \ldots, P-M-1$$

$$m_k = (b_k + x_k) \bmod 2 \text{ for } k=P-M, \ldots, P-1 \quad \text{[Equation 3]}$$

In step S620, the masked CSI is transmitted on a PUSCH. A/N may be multiplexed together with the CSI on the PUSCH, and then may be transmitted.

The masking sequence may indicate an A/N transmission state. The transmission state may include whether A/N is transmitted, an A/N transmission location, an A/N transmission channel (e.g., a PUCCH or a PUSCH), a PUCCH format (e.g., PUCCH format 1a/1b or PUCCH format 3) for A/N transmission, the number of A/N bits, and a combination thereof.

Although the aforementioned embodiment describes that the $1^{st}$ UCI and the $2^{nd}$ UCI are transmitted by being multiplexed on the PUSCH for example, the $1^{st}$ UCI and the $2^{nd}$ UCI may be transmitted in different UL channels, different serving cells, and/or different UL subframes. For example, the $1^{st}$ UCI may be transmitted on the PUSCH, and the $2^{nd}$ UCI may be transmitted on the PUCCH. Alternatively, the $1^{st}$ UCI may be transmitted on a primary cell, and the $2^{nd}$ UCI may be transmitted on a secondary cell.

The masking sequence may be masked with the entirety or part of a bit sequence of the $2^{nd}$ UCI.

Hereinafter, an example of various masking sequences for a 8-bit CRC with M=8 is described. A transmission state indicated by the masking sequence and/or the number of bits thereof are for exemplary purposes only.

In a first embodiment, the masking sequence may indicate whether A/N is transmitted for all serving cells. The following table shows an example of the masking sequence.

TABLE 3

| Masking sequence | Content |
| --- | --- |
| <0, 0, 0, 0, 0, 0, 0, 0> | A/N is not transmitted. For example, A/N of all cells are DTX. |
| <1, 1, 1, 1, 1, 1, 1, 1> | A/N is transmitted. For example, at least one A/N is ACK or NACK. |

In a second embodiment, the masking sequence may indicate whether HARQ ACK/NACK is transmitted for a specific serving cell or a specific serving cell group. The following table shows an example of the masking sequence.

TABLE 4

| Masking sequence | Content |
| --- | --- |
| <0, 0, 0, 0, 0, 0, 0, 0> | A/N is not transmitted. |
| <1, 1, 1, 1, 1, 1, 1, 1> | A/N is transmitted for $1^{st}$ serving cell group. |
| <1, 1, 1, 1, 0, 0, 0, 0> | A/N is transmitted for $2^{nd}$ serving cell group. |
| <0, 0, 0, 0, 1, 1, 1, 1> | A/N is transmitted for all serving cell groups. |

Information regarding the $1^{st}$ and $2^{nd}$ serving cell groups may be reported by the BS to the wireless device through an RRC message, etc. Each serving cell group may include one or more serving cells. The following table is a case where the serving cell group is extended to three serving cell groups.

TABLE 5

| Masking sequence | Content |
| --- | --- |
| <0, 0, 0, 0, 0, 0, 0, 0> | A/N is not transmitted. |
| <1, 1, 1, 1, 1, 1, 1, 1> | A/N is transmitted for $1^{st}$ serving cell group. |
| <1, 1, 1, 1, 0, 0, 0, 0> | A/N is transmitted for $1^{st}$ and $2^{nd}$ serving cell groups. |
| <0, 0, 0, 0, 1, 1, 1, 1> | A/N is transmitted for $1^{st}$, $2^{nd}$, and $3^{rd}$ serving cell groups. |

In the embodiment of Table 4 and Table 5, since the $1^{st}$ serving cell group is always selected, a primary cell may be included.

In a third embodiment, the masking sequence may indicate a transmission state of HARQ ACK/NACK for the primary cell and the secondary cell. The reason above is that an importance thereof is high since the primary cell is used to activate/deactivate the secondary cell.

TABLE 6

| Masking sequence | Content |
| --- | --- |
| <1, 1, 1, 1, 1, 1, 1, 1> | A/N is not transmitted. |
| <0, 0, 0, 0, 0, 0, 0, 0> | A/N is transmitted for primary cell. |
| <1, 0, 1, 0, 1, 0, 1, 0> | A/N is transmitted for primary cell and secondary cell. |

The masking sequence may be used to distinguish whether a PUCCH resource used for A/N transmission is used or whether the PUCCH resource is allocated. When A/N transmission is configured with a PUCCH format 3, A/N transmission in the primary cell uses the PUCCH format 3 or a PUCCH format 1a/1b according to whether a resource is allocated for the PUCCH format 3. A/N transmission of the secondary cell uses the PUCCH format 3. If a resource allocation for the PUCCH format 3 is received from the BS, the wireless device may use a masking sequence indicating that the PUCCH format 3 is used. If the resource allocation for the PUCCH format 3 is not received from the BS, the wireless device may use a masking sequence indicating that the PUCCH format 3 is not used.

When the BS receives the masked CSI, the following operation is performed.

If a CRC detection fails, the BS may attempt to demodulate a modulation symbol corresponding to A/N, or may give up the demodulation.

If the CRC detection on CSI fails, the BS may not perform demodulation on the modulation symbol corresponding to A/N. Alternatively, if the CRC detection on CSI fails, the BS may attempt to restore corresponding A/N by performing demodulation on the demodulation symbol corresponding to the A/N.

A transmission state of A/N for a plurality of serving cell may be reported by the wireless device to the BS by using CRC masking. An ambiguity between the BS and the wireless device may be decreased with respect to the A/N transmission state.

Now, CSI mapping on a PUSCH is described.

As described in the explanation in association with FIG. 4, a method is used in which a modulation symbol of CSI is mapped, and thereafter a modulation symbol of A/N is overwritten. A channel interleaver matrix is an Rmux×Cmux mapping matrix used to multiplex a UL transport block and UCI.

According to the conventional method, CSI is subjected to time-first mapping, and thus a modulation symbol to be punctured exists in a middle portion of a CSI symbol sequence. In the example of FIG. 4, among CSI modulation symbols having indices 0 to 116, CSI modulation symbols having indices of 50, 51, 56, 57, 61, 62, 66, 67, 70, 71, 74, 75, 78. 79, 82, 83, 86, 87, 90, 91, 94, 95, 98, 99, 102, 103, 106, 107, 110, 111, 114, and 115 are punctured.

The proposed method enables a punctured modulation symbol to correspond to a last portion of a CSI symbol sequence, and enables the BS to more easily perform a bit correction according to whether it is punctured.

Hereinafter, it is assumed that Rmux=12, Cmux=12, and one subframe includes 14 OFDM symbols. An OFDM symbol for transmitting RI, except for an OFDM symbol for transmitting DM-RS, is called an OFDM symbol with l=1, 4, 7, 10 (such a symbol is called an RI OFDM symbol), and an OFDM symbol for transmitting A/N is called an OFDM symbol with l=2, 3, 8, 9 (such a symbol is called an A/N OFDM symbol). The number of OFDM symbols in a subframe, the number/location of OFDM symbols for transmitting DM RS, the number/location of RI OFDM symbols, and the number/location of A/N OFDM symbols are for exemplary purposes only.

Figure 7:
FIG. 7 shows resource mapping according to an embodiment of the present invention.
Figure 7:
Figure 7:
Figure 7:

FIG. 7 shows resource mapping according to an embodiment of the present invention.

RI is first mapped, and thereafter CSI is mapped in an ascending order of l starting from k=0, except for an A/N OFDM symbol. In addition, the CSI is mapped to the A/N OFDM symbol in a reverse order (i.e., l=3, 8, 9, 2) of the OFDM symbol to which the A/N is mapped. Finally, the A/N is mapped across A/N OFDM symbols.

Figure 8:
FIG. 8 shows resource mapping according to another embodiment of the present invention.
Figure 8:
Figure 8:
Figure 8:

FIG. 8 shows resource mapping according to another embodiment of the present invention.

Comparing with the embodiment of FIG. 7, an order of an A/N OFDM symbol to which CSI is mapped is different. The order is l=2, 3, 8, 9, whereas l=3, 8, 9, 2 in the embodiment of FIG. 7. The mapping order of the A/N OFDM symbol may be defined differently. The mapping order of the A/N OFDM symbol may be pre-defined, or may be reported by a BS to a wireless device through an RRC message, etc.

Figure 9:
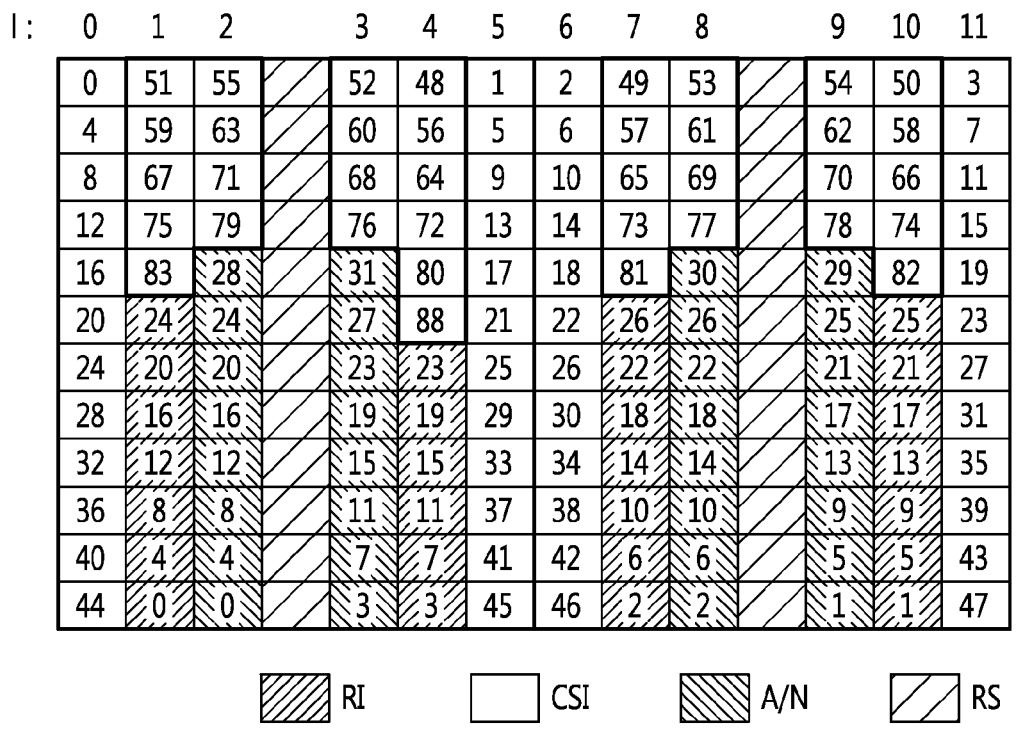

FIG. 9 shows resource mapping according to another embodiment of the present invention.

RI is first mapped, and thereafter CSI is mapped in an ascending order of l starting from k=0, except for an RI OFDM symbol and an A/N OFDM symbol. That is, the CSI is not mapped to an OFDM symbol with l=1,2,3,4,7,8,9,10. In addition, the CSI is mapped to the RI OFDM symbol and the A/N OFDM symbol according to a specific mapping order. Herein, the mapping order is l=4,7,10,1,3,8,9,2. Finally, A/N is mapped across A/N OFDM symbols.

The mapping order may be predefined, or may be reported by a BS to a wireless device through an RRC message, etc.

Figure 10:
FIG. 10 shows resource mapping according to another embodiment of the present invention.
Figure 10:
Figure 10:
Figure 10:

FIG. 10 shows resource mapping according to another embodiment of the present invention.

Comparing with the embodiment of FIG. 9, a mapping order is l=1,2,3,4,7,8,9,10.

Figure 11:
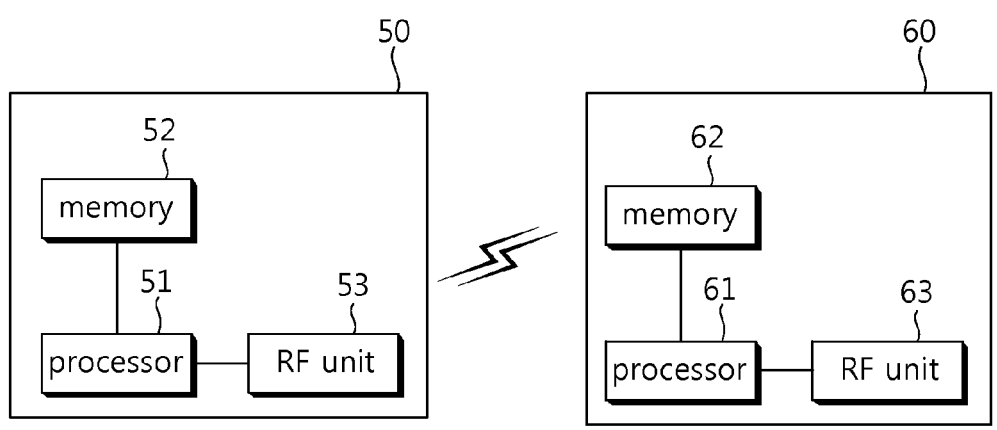
FIG. 11 is a block diagram showing a wireless communication system according to an embodiment of the present invention.

FIG. 11 is a block diagram showing a wireless communication system according to an embodiment of the present invention.

A BS 50 includes a processor 51, a memory 52, and a radio frequency (RF) 53. The memory 52 is coupled to the processor 51, and stores a variety of information for driving the processor 51. The RF unit 53 is coupled to the processor 51, and transmits/receives a radio signal. The processor 51 implements the proposed functions, procedures, and/or methods. In the aforementioned embodiment, an operation of the BS may be implemented by the processor 51. The processor 51 may transmit a UL grant through a PDCCH, and may receive CSI and/or A/N through a PUSCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits/receives a radio signal. The processor 61 implements the proposed functions, procedures, and/or methods. In the aforementioned embodiment, an operation of the wireless device may be implemented by the processor 61. The processor 61 may implement a control information transmission method according to the embodiment of FIG. 6, and may implement UCI resource mapping.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting uplink control information in a wireless communication system, the method performed by a wireless device and comprising:
   determining, by the wireless device, whether to multiplex first uplink control information with second uplink control information;
   generating, by the wireless device, a masking sequence based on the determination;
   masking, by the wireless device, a cyclic redundancy check (CRC) of the first uplink control information with the masking sequence; and
   transmitting, by the wireless device, the masked first uplink control information through an uplink channel,
   wherein the first uplink control information includes channel state information (CSI), and the second uplink control information includes a hybrid automatic repeat request (HARQ) positive-acknowledgement (ACK)/negative-acknowledgement (NACK), and
   wherein the masking sequence indicates the HARQ ACK/NACK transmission state for at least one serving cell.

2. The method of claim 1, wherein the masking sequence indicates further whether HARQ ACK/NACKs for all configured serving cells are multiplexed to the uplink channel.

3. The method of claim 1, wherein the masking sequence indicates further whether a HARQ ACK/NACK for at least one serving cell is multiplexed to the uplink channel.

4. The method of claim 1, wherein the CSI is triggered at a request of a base station.

5. The method of claim 1, wherein the masking sequence indicates further whether the second uplink control information is multiplexed to the uplink channel.

6. The method of claim 1, wherein the uplink channel includes a physical uplink shared channel (PUSCH).

7. The method of claim 1, wherein the number of bits of the first uplink control information is greater than 11.

8. A wireless device for transmitting uplink control information in a wireless communication system, the wireless device comprising:
   a radio frequency (RF) unit configured to transmit and receive a radio signal; and
   a processor operatively coupled to the RF unit and configured to:
   determine whether to multiplex first uplink control information with second uplink control information;
   generate a masking sequence based on the determination;
   mask a cyclic redundancy check (CRC) of the first uplink control information with the masking sequence; and transmit the masked first uplink control information through an uplink channel via the RF unit, wherein the first uplink control information includes channel state information (CSI), and the second uplink control information includes a hybrid automatic repeat request (HARQ) positive-acknowledgement (ACK)/negative-acknowledgement (NACK), wherein the masking sequence indicates the HARQ ACK/NACK transmission state for at least one serving cell.

9. The wireless device of claim 8, wherein the masking sequence indicates further whether HARQ ACK/NACKs for all configured serving cells are multiplexed to the uplink channel.

10. The wireless device of claim 8, wherein the masking sequence indicates further whether a HARQ ACK/NACK for at least one serving cell is multiplexed to the uplink channel.

\* \* \* \* \*